(12) United States Patent
Hofstra et al.

(10) Patent No.: US 9,068,091 B2
(45) Date of Patent: Jun. 30, 2015

(54) BIO-BASED POLYESTER LATEX

(71) Applicant: OCE-TECHNOLOGIES B.V., Venlo (NL)

(72) Inventors: Ronald Hofstra, Venlo (NL); Roy W. N. Evers, Roermond (NL)

(73) Assignee: OCE TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/021,682

(22) Filed: Sep. 9, 2013

(65) Prior Publication Data

US 2014/0011931 A1    Jan. 9, 2014

Related U.S. Application Data

(63) Continuation of application No. PCT/EP2012/053615, filed on Mar. 2, 2012.

(30) Foreign Application Priority Data

Mar. 15, 2011   (EP) .................................. 11158265

(51) Int. Cl.
*C09D 11/30* (2014.01)
*C08G 63/672* (2006.01)
*C08G 63/80* (2006.01)
*C09D 11/104* (2014.01)

(52) U.S. Cl.
CPC .............. *C09D 11/30* (2013.01); *C08G 63/672* (2013.01); *C08G 63/80* (2013.01); *C09D 11/104* (2013.01)

(58) Field of Classification Search
USPC .................. 523/309, 322, 334; 524/156, 604; 528/298
See application file for complete search history.

(56) References Cited

U.S. PATENT DOCUMENTS

| | | | |
|---|---|---|---|
| 4,418,174 A | 11/1983 | Dhein et al. | |
| 6,063,464 A | 5/2000 | Charbonneau et al. | |
| 6,485,819 B2 | 11/2002 | Hayes | |
| 6,762,276 B2 | 7/2004 | Sumner, Jr. et al. | |
| 8,106,148 B2 * | 1/2012 | Vijayendran et al. | 528/295.5 |
| 8,574,802 B2 * | 11/2013 | Farrugia et al. | 430/109.1 |
| 2012/0258393 A1 * | 10/2012 | Zhou et al. | 430/108.11 |

FOREIGN PATENT DOCUMENTS

| | | |
|---|---|---|
| CN | 1298343 A | 6/2001 |
| EP | 1 055 7122 A2 | 11/2000 |
| JP | 2010-215770 A | 11/2000 |
| JP | 2010-95696 A | 4/2010 |

OTHER PUBLICATIONS

European Search Report issued in EP 11 15 8265, completed Jul. 29, 2011.
International Search Report issued in PCT/EP2012/053615, dated Jun. 8, 2012.
Sablong et al., "Incorporation of Isosorbide into Poly(butylene terephthalate) via Solid-State Polymerization", Biomacromolecules, American Chemical Society, Nov. 10, 2008, pp. 3090-3097, vol. 9, No. 11, XP-002572838.
Storbeck et al., "Syntyesis and Thermal Analysis of Copolyesters Deriving from 1,4:3,6-Dianhydrosorbitol, Ethylene Glycol, and Terephthalic Acid", John Wiley & Sons, Inc., Journal of Applied Polymer Science, Feb. 14, 1966, pp. 1199-1202, vol. 59, No. 7, XP-000554627.
Written Opinion of the International Searching Authority issued in PCT/EP2012/053615, dated Jun. 8, 2012.

* cited by examiner

*Primary Examiner* — Tae H Yoon
(74) *Attorney, Agent, or Firm* — Birch, Stewart, Kolasch & Birch, LLP

(57) ABSTRACT

Disclosed is a copolyester which is the reaction product of a mixture having from between 30 and 50 mol % of a first monomer being an isohexide; between 40 and 60 mol % of a second monomer being an aromatic dicarboxylic acid or a cycloaliphatic dicarboxylic acid; and between 1 and 20 mol % of a third monomer being an aliphatic diol, the copolyester having an acid number of between 10 and 50. Also disclosed is a process for preparing such copolyesters, a latex composition containing such a copolyester, a method for preparing such a latex composition and the use of a particular latex as an (ink-jet) ink.

14 Claims, 1 Drawing Sheet

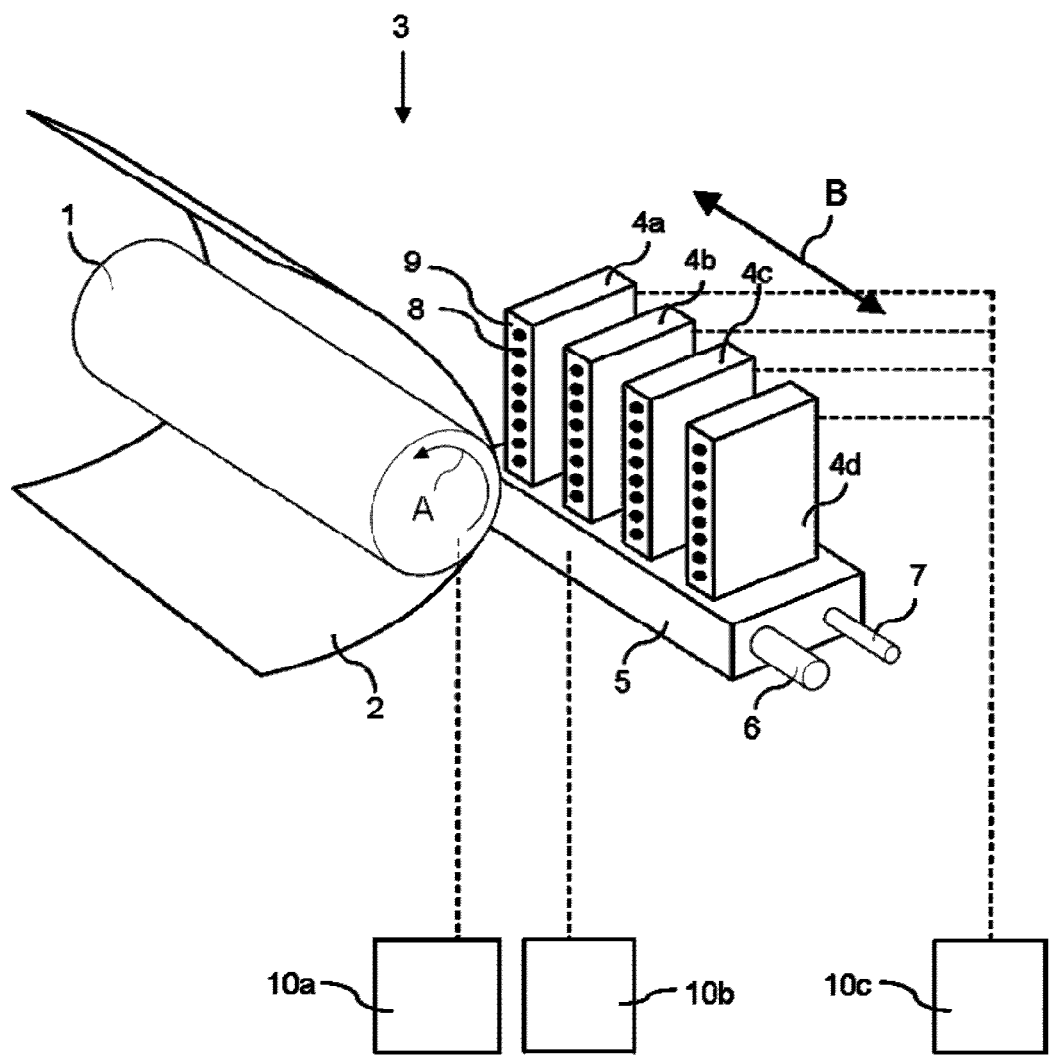

BIO-BASED POLYESTER LATEX

CROSS REFERENCE TO RELATED APPLICATIONS

This application is a Bypass Continuation of PCT International Application No. PCT/EP2012/053615 filed on Mar. 2, 2012, which claims priority under 35 U.S.C. §119(a) to patent application Ser. No. 11/158,265.6 filed in Europe on Mar. 15, 2011, all of which are hereby expressly incorporated by reference into the present application.

BACKGROUND

The present invention relates to (partly) bio-based copolyesters suitable for use in latex compositions, a process for preparing such copolyesters by a copolymerization of a first diol being an isohexide, a cyclic dicarboxylic acid and a (second) diol. The present invention further relates to a latex composition comprising said copolyester and a process for preparing such a latex. The invention also relates to inkjet inks comprising said polyester latex.

A latex is stable dispersion of polymer nano- or microparticles in a liquid, preferably water.

State of the art latex-inks comprise a resin which constitutes the main solid fraction of the ink, and colorant(s) dispersed in water. For tuning ink properties additives such as co-solvents and/or dispersing agents may be used. Commonly used resins in latex-inks are petrochemically based synthetic polyesters and/or polyacrylics.

In general, the used polyesters are synthesized using phthalates and/or bisphenol A as monomers. Such monomers more and more become a point of discussion in relation to health issues. Moreover, increasing oil-prices may render petrochemically based (polymeric) materials too expensive and therefore not feasible for a number of applications, in particular when used in products having a short life-time. Therefore there exists an increasing need for other resources of starting materials for polymeric materials (in this case in particular polyesters) having no health issues or at least to a lesser extent and preferably being cheap.

The application of such polymers in 'short-life' or disposable products, for example in inks for printing transient documents (e.g. newspapers, magazines, personalized mail, advertising materials and the like) also requires that the polymers are biodegradable. Inks comprising polymers having an improved biodegradability may show better de-inkability, because the ink components will decompose more easily and detach from the paper fibers in the recycle process. With an improved de-inkability, the quality of the recycled paper may increase.

Isohexides (i.e. isosorbide, isomannide and isoidide) have been identified as an interesting source of renewable raw materials for many applications. Isohexides are readily made from renewable resources such as sugars and starches. For example, isosorbide (also referred to as D-isosorbide) can be made from D-glucose by hydrogenation followed by acid-catalyzed dehydration. Polymers comprising isohexides as monomers (bio-esters) are known for their biodegradability.

U.S. Pat. No. 6,485,819 B2 discloses a copolyester of the reaction product of: (a) one or more aromatic dicarboxylic acids or an ester thereof; (b) one or more aliphatic dicarboxylic acids or an ester thereof; and (c) isosorbide. U.S. Pat. No. 6,485,819 also discloses that such polyesters are useful to form articles of increased biodegradability.

U.S. Pat. No. 6,762,276 discloses a process for hydrogenating a polyester oligomer containing terephtalic acid residues wherein terephtalic acid residues are converted to residues of 1,4-cyclohexanedicarboxylic acid. Further disclosed is a process for polymerizing the hydrogenated polyester oligomer.

U.S. Pat. No. 4,418,174 discloses dianhydromannitol (isomannide), dianhydrosorbitol (isosorbide) and dianhydromannitol semi-esters and dianhydrosorbitol semi-esters to be outstanding raw materials for the production of aqueous stoving lacquers based on polyesters. The disclosed aqueous stoving lacquers are compositions comprising (A) from 10 to 90% by weight of polyester having an average molecular weight Mn of from 1000 to 10000; (B) from 10 to 50% by weight of a reactive diluent, which are understood to be low-viscosity materials which dilute resinous binders and thus impart to the lacquer the viscosity which is required for its application, which contain functional groups capable of mixed polymerization of mixed condensation with the lacquer resin (A), and which, during the hardening procedure (i.e. curing), mainly become a component of the hardened lacquer film. The reactive diluent therefore also acts as a crosslinking agent; (C) up to 50% by weight of water; and (D) from 0 to 40% by weight of an aminoplast resin. The percentages are based on the sum of components A, B and D.

(Co)polyesters and (co)polyester compositions known from the prior art are not optimized for use in a latex, or in particular in a latex ink. For being suitable to be used in a latex ink a resin has to fulfill a number of specifications demanding possibly conflicting material characteristics. For example for a latex ink a (binder) resin is needed which is not too brittle to obtain good scratchfastness of the print. This translates into the property of polymer in the latex having a glass transition temperature ($T_g$) not too far removed from the temperature of use of the print, usually ambient temperature. On the other hand for anti-blocking demands (i.e. unwanted transfer of ink from a print to another substrate under pressure and heat) of the print it is important that the binder material has a high enough softening point, i.e. $T_g$. Both requirements being in conflict with each other.

For anti-blocking properties and waterfastness of the print, the resin also needs to be waterresistant, i.e. water repellent, which translates into hydrophopicity of the printed ink.

For the purpose of the present invention an ink is sought that is jettable, i.e. an ink suitable for use in an inkjet process.

It is therefore an object of the present invention to provide (partly) bio-based polyesters suitable for use in a latex, in particular in latex inks, having satisfactory anti-blocking properties, waterfastness and jettability.

It is another object of the present invention to provide a method for preparing such (partly) bio-based copolyesters.

It is another object of the present invention to provide a process for preparing a latex composition of (partly) bio-based polyesters.

It is yet another object of the present invention to provide a latex, in particular a latex ink comprising a (partly) bio-based polyester binder having such properties that the above stated requirements are at least partly satisfied.

SUMMARY OF THE INVENTION

These objects are at least partly achieved by providing a copolyester from between 30 and 50 mol %, preferably between 35 and 47 mol %, more preferably between 40 and 45 mol % of a first monomer being an isohexide; between 40 and 60 mol %, preferably between 45 and 55 mol %, more preferably between 47 and 52 mol % of a second monomer being an aromatic dicarboxylic acid or a cycloaliphatic dicarboxylic acid; and between 1 and 20 mol %, preferably between 3 and 15 mol %, more preferably between and 10 mol % of a third monomer being an aliphatic diol, the copolyester having an acid number of between 10 and 50, preferably between 12 and 45, more preferably between 15 and 35.

The copolyester of the present invention is obtainable by reacting the above indicated amounts of the first, second and third monomers as will be explained later.

In chemistry, acid value (or "neutralization number" or "acid number" or "acidity") is expressed as the mass of potassium hydroxide (KOH) in milligrams that is required to neutralize one gram of chemical substance. The acid number is a measure of the amount of carboxylic acid groups in a chemical compound, e.g. a polyester according to the present invention, or in a mixture of compounds. In a typical procedure, a known amount of sample dissolved in a solvent is titrated with a solution of potassium hydroxide with known concentration and with a color indicator, e.g. phenolphthalein or by using a combined electrode (potentiometric titration).

The acid number should not be below 10, which may lead to very unstable dispersions of the polyester in water (latex). The polyester may precipitate. The acid number should also not be above 50, because above that level the polyester may dissolve. So outside the above stated range of the acid number it is hard or even impossible to obtain a dispersion of the polyester in water.

BRIEF DESCRIPTION OF THE DRAWINGS

The invention will now be explained detail with reference to the FIG. 1:

FIG. 1 shows a schematic representation of an ink jet printing assembly suitable for jetting an ink according to the present invention.

DETAILED DESCRIPTION

FIG. 1 shows a schematic representation of an ink jet printing assembly suitable for jetting an ink according to the present invention.

MATERIALS FOR MANUFACTURING A (PARTLY) BIO-BASED COPOLYESTER ACCORDING TO THE PRESENT INVENTION

First Monomer: Isohexide

For the purpose of the present invention the term isohexides will be used to indicate all three stereo-isomers of 1,4:3,6-dianhydrohexitol as shown below.

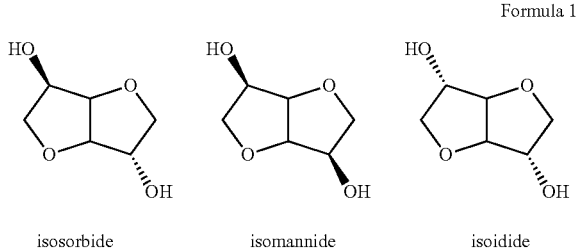 [SMILES: O[C@@H]1COC2C1OC[C@@H]2O ; O[C@@H]1COC2C1OC[C@H]2O ; O[C@H]1COC2C1OC[C@@H]2O]

Formula 1 isosorbide    isomannide    isoidide

In an embodiment, the isohexide is isosorbide. Isosorbide is a heterocyclic compound derived from glucose and is thus a biofeedstock. Glucose can be hydrogenated to sorbitol, which upon double dehydration gives isosorbide. The above isohexides may, however, also be synthetically obtained.

Second Monomer: Diacid

In principle all diacids are suitable for polymerization with isohexides, although in the applications according to an aspect of the present invention it is preferred that the obtained polyester is amorphous. It is further preferred that the obtained polyester has a glass transition temperature ($T_g$) of between 30° C. and 90° C., more preferably between 40° C. and 75° C. and even more preferably between 50° C. and 65° C. The $T_g$ may be increased by introducing chain stiffness into the polymer. It is therefore preferred to use cyclic diacids to provide for the chain stiffness, which may either be aromatic diacids or cycloaliphatic diacids. The ring may contain heteroatoms (e.g. O, N, S, P etc.) and the ring size may be between 4 and 14 atoms, preferably between 5 and 8, more preferably 6 or 7. The aliphatic or aromatic ring may be substituted optionally with groups containing heteroatoms.

From an environmental point of view, aromatic diacids are less preferred than cycloaliphatic diacids.

If cycloaliphatic diacids are used, the ring size is preferably kept small, in order to provide for the required chain stiffness. However, the ring size should not be too small, because of undesired ring strains in the polyester, which are sensitive to degradation of the polymer. Ring sizes of 5, 6 or 7 atoms are most preferred.

The second monomer may be selected from or derived from an aromatic dicarboxylic acid such as phtalic acid; isophtalic acid; terephtalic acid; 2,5-furandicarboxylic acid; 2,5 thiophenedicarboxylic acid; 2,5 pyrroledicarboxylic acid; 2,6 naphthalenedicarboxylic acid; 2,7 naphthalenedicarboxylic acid; 3,4' and 4,4' diphenyl ether dicarboxylic acid; 3,4' and 4,4' diphenyl sulfide dicarboxylic acid; 4,4' diphenyl sulfone dicarboxylic acid; 3,4' and 4,4' benzophenonedicarboxylic acid; and 1,4 napthalenedicarboxylic acid. 2,5-furandicarboxylic acid is a preferred aromatic dicarboxylic acid, because is it derivable from a bio feedstock.

In an embodiment, the second monomer is a cycloaliphatic dicarboxylic acid having a ring comprising between 4 and 12 carbon atoms and optionally one or more heteroatoms, the ring preferably comprises between 5 and 8 carbon atoms and no heteroatoms.

Suitable second monomers are cycloaliphatic dicarboxylic acids selected or derived from, but not limited to: cyclobutane-1,2-dicarboxylic acid, cyclobutane-1,3-dicarboxylic acid, cyclopentane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, cycloheptane-1,2-dicarboxylic acid, cycloheptane-1,3-dicarboxylic acid, cycloheptane-1,4-dicarboxylic acid, cyclooctane-1,2-dicarboxylic acid, cyclooctane-1,3-dicarboxylic acid, cyclooctane-1,4-dicarboxylic acid, cyclooctane-1,5-dicarboxylic acid, cyclononane-1,2-dicarboxylic acid, cyclononane-1,3-dicarboxylic acid, cyclononane-1,4-dicarboxylic acid, cyclononane-1,5-, cyclododecane-1,2-dicarboxylic acid, dicarboxylic acid, cyclodecane-1,2-dicarboxylic acid, cyclodecane-1,3-dicarboxylic acid, cyclodecane-1,4-dicarboxylic acid, cyclodecane-1,5-dicarboxylic acid, cyclodecane-1,6-dicarboxylic acid, cycloundecane-1,2-dicarboxylic acid, cycloundecane-1,3-dicarboxylic acid, cycloundecane-1,4-dicarboxylic acid, cycloundecane-1,5-dicarboxylic acid, cycloundecane-1,6-dicarboxylic acid, cyclododecane-1,2-dicarboxylic acid, cyclododecane-1,3-dicarboxylic acid, cyclododecane-1,4-dicarboxylic acid, cyclododecane-1,5-dicarboxylic acid, cyclododecane-1,6-dicarboxylic acid, cyclododecane-1,7-dicarboxylic acid.

Monomers having one or more unsaturations in the ring may also be suitable. Such monomers may be selected or derived from, but are not limited to: 1-cyclobutene-1,2-dicarboxylic acid, 2-cyclobutene-1,2-dicarboxylic acid, 3-cyclobutene-1,2-dicarboxylic acid, 1-cyclobutene-1,3-dicarboxylic acid, 1-cyclopentene-1,2-dicarboxylic acid, 2-cyclopentene-1,2-dicarboxylic acid, 3-cyclopentene-1,2-dicarboxylic acid, 1-cyclopentene-1,3-dicarboxylic acid, 3-cyclopentene-1,3-dicarboxylic acid, 4-cyclopentene-1,3-dicarboxylic acid, 1-cyclohexene-1,2-dicarboxylic acid, 2-cyclohexene-1,2-dicarboxylic acid, 3-cyclohexene-1,2-dicarboxylic acid, 4-cyclohexene-1,2-dicarboxylic acid, 1-cyclohexene-1,3-dicarboxylic acid, 3-cyclohexene-1,3-dicarboxylic acid, 4-cyclohexene-1,3-dicarboxylic acid, 1-cyclohexene-1,4-dicarboxylic acid, 2-cyclohexene-1,4-dicarboxylic acid, 1-cycloheptene-1,2-dicarboxylic acid, 2-cycloheptene-1,2-dicarboxylic acid, 3-cycloheptene-1,2-dicarboxylic acid, 4-cycloheptene-1,2-dicarboxylic acid, 1-cycloheptene-1,3-dicarboxylic acid, 3-cycloheptene-1,3-dicarboxylic acid, 4-cycloheptene-1,3-dicarboxylic acid, 5-cycloheptene-1,3-dicarboxylic acid, 1-cycloheptene-1,4-dicarboxylic acid, 2-cycloheptene-1,4-dicarboxylic acid, 4-cycloheptene-1,4-dicarboxylic acid, 5-cycloheptene-1,4-dicarboxylic acid, 1-cyclooctene-1,2-dicarboxylic acid, 2-cyclooctene-1,2-dicarboxylic acid, 3-cyclooctene-1,2-dicarboxylic acid, 4-cyclooctene-1,2-dicarboxylic acid, 5-cyclooctene-1,2-dicarboxylic acid, 1-cyclooctene-1,3-dicarboxylic acid, 3-cyclooctene-1,3-dicarboxylic acid, 4-cyclooctene-1,3-dicarboxylic acid, 5-cyclooctene-1,3-dicarboxylic acid, 6-cyclooctene-1,3-dicarboxylic acid, 1-cyclooctene-1,4-dicarboxylic acid, 2-cyclooctene-1,4-dicarboxylic acid, 4-cyclooctene-1,4-dicarboxylic acid, 5-cyclooctene-1,4-dicarboxylic acid, 6-cyclooctene-1,4-dicarboxylic acid, 1-cyclooctene-1,5-dicarboxylic acid, and 2-cyclooctene-1,5-dicarboxylic acid.

Other suitable dicarboxylic acids may be derived from the above cited monomers and contain one or more substituents.

In an embodiment the cycloaliphatic dicarboxylic is 1,4-cyclohexane dicarboxylic acid.

Third Monomer: Second Diol

In an embodiment, the third monomer is a diol having the following general formula:

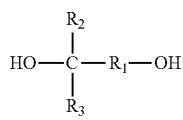

Formula 2 wherein:

$R_1$ is an optionally substituted bifunctional group comprising between 1-13 carbon atoms and optionally one or more heteroatoms;

$R_2$ and $R_3$ are independently selected from —H and an optionally substituted alkyl group comprising between 1 and 12 carbon atoms and optionally one or more heteroatoms.

In an embodiment, at least one of the $R_2$ and $R_3$ groups is an optionally substituted alkyl group comprising between 1 and 12 carbon atoms and optionally one or more heteroatoms.

Such a second diol may be introduced to further tune waterfastness and the $T_g$ of the obtained polyester. In an optimal situation, the main chain (i.e. HO—C—$R_1$—OH) should not be too long, preferably in total comprising 2 or 3 carbon atoms, such that $R_1$ comprises 1 or 2 carbon atoms, optionally substituted. It has been surprisingly found that the waterfastness of the polyesters according to the present invention comprising monomer units of a second monomer being a diol and having a short main chain significantly improves. However said shorter main chain may introduce more rigidity in the obtained polyester chain, possibly leading to an undesired high $T_g$. Therefore at least one side chain having between 2 and 14 atoms is introduced on said main chain of the diol. In order to prevent crystallization of the obtained polyester, the length of the side chains of the second diol should not exceed 14 atoms.

Suitable third monomers are diols selected or derived from, but not limited to: 1,2-ethanediol; 1,3-propanediol; 1,2-propanediol (1-methyl-1,2-ethanediol; isopropanediol); 1,4-butanediol; 1,3-butanediol (1-methyl-1,3-propanediol); 1,2-butanediol (1-ethyl-1,2-ethanediol); 2,3-butanediol (1,2-dimethyl-1,2-ethanediol); 1,5-pentanediol; 1,4-pentanediol (1-methyl-1,4-butanediol); 1,3-pentanediol (1-ethyl-1,3-propanediol); 1,2-pentanediol (1-propyl-1,2-ethanediol; 1-n-propyl-1,2-ethanediol; 1-i-propyl-1,2-ethanediol); 2,4-pentanediol (1,3-dimethyl-1,3-propanediol); 2,3-pentanediol (1-methyl-2-ethyl-1,2-ethanediol); 1,6-hexanediol; 1,5-hexanediol (1-methyl-1,5-pentanediol); 1,4-hexanediol; 1,3-hexanediol, 1,2-hexanediol; 2,5-hexanediol; 2,4-hexanediol; 2,3-hexanediol; 3,4-hexanediol; 1,7-heptanediol; 1,6-heptanediol (1-methyl-1,6-hexanediol); 1,5-heptanediol (1-ethyl-1,5-pentanediol); 1,4-heptanediol (1-propyl-1,4-butanediol); 1,3-heptanediol (1-butyl-1,3-propanediol; 1-n-butyl-1,3-propanediol; 1-sec-butyl-1,3-propanediol; 1-tert-butyl-1,3-propanediol); 1,2-heptanediol (1-pentyl-1,2-ethanediol); 1,8-octanediol; 1,7-octanediol (1-methyl-1,7-heptanediol); 1,6-octanediol (1-ethyl-1,6-hexanediol); 1,5-octanediol (1-propyl-1,5-pentanediol); 1,4-octanediol (1-butyl-1,4-butanediol); 1,3-octanediol (1-pentyl-1,3-propandiol); 1,2-octanediol (1-hexyl-1,2-ethanediol); 1,9-nonanediol; 1,8-nonanediol (1-methyl-1,8-octanediol); 1,7-nonanediol (1-ethyl-1,7-heptanediol); 1,6-nonanediol (1-propyl-1,6-hexanediol); 1,5-nonanediol (1-butyl-1,5-pentanediol); 1,4-nonanediol (1-pentyl-1,4-butanediol); 1,3-nonanediol (1-hexyl-1,3-propanediol); 1,2-nonanediol (1-heptyl-1,2-ethanediol); 1,10-decanediol; 1,9-decanediol (1-methyl-1,9-nonanediol); 1,8-decanediol (1-ethyl-1,8-octanediol); 1,7-decanediol (1-propyl-1,7-heptanediol); 1,6-decanediol (1-butyl-1,6-hexanediol); 1,5-decanediol (1-pentyl-1,5-pentanediol); 1,4-decanediol (1-hexyl-1,4-butanediol); 1,3-decanediol (1-heptyl-1,3-propanediol); 1,2-decanediol (1-octyl-1,2-ethanediol); 1,11-undecanediol; 1,10-undecanediol (1-methyl-1,10-decanediol); 1,9-undecanediol (1-ethyl-1,9-nonanediol); 1,8-undecanediol (1-propyl-1,8-octanediol); 1,7-undecanediol (1-butyl-1,7-heptanediol; 1,6-undecanediol (1-pentyl-1,6-hexanediol); 1,5-undecanediol (1-hexyl-1,5-pentanediol); 1,4-undecanediol (1-heptyl-1,4-butanediol); 1,3-undecanediol (1-octyl-1,3-propanediol); 1,2-undecanediol (1-nonyl-1,2-ethanediol); 1,12-dodecanediol; 1,11-dodecanediol (1-methyl-1,11-undecanediol); 1,10-dodecanediol (1-ethyl-1,10-decanediol); 1,9-dodecanediol (1-propyl-1,9-nonanediol); 1,8-dodecanediol (1-butyl-1,8-octanediol); 1,7-dodecanediol (1-pentyl-1,7-heptanediol); 1,6-clodecanediol (1-hexyl-1,6-hexanediol); 1,5-dodecanediol (1-heptyl-1,5-pentanediol); 1,4-dodecanediol (1-octyl-1,4-butanediol); 1,3-dodecanediol (1-nonyl-1,3-propanediol); 1,2-dodecanediol (1-decyl-1,2-ethanediol); 1,13-tridecanediol; 1,12-tridecanediol (1-methyl-1,12-dodecanediol); 1,11-tridecanediol (1-ethyl-1,11-undecanediol); 1,10-tridecanediol (1-propyl-1,10-decanediol); 1,9-tridecanediol (1-butyl-1,9-nonanediol); 1,8-tridecanediol (1-pentyl-1,8-octanediol); 1,7-tridecanediol (1-hexyl-1,7-heptanediol); 1,6-tridecanediol (1-heptyl-1,6-hexanediol); 1,5-tridecanediol (1-octyl-1,5-pentanediol); 1,4-tridecanediol (1-nonyl-1,4-butanediol); 1,3-tridecanediol (1-decyl-1,3-propanediol); 1,2-tridecanediol (1-undecyl-1,2-ethanediol); 1,14-tetradecanediol; 1,13-tridecanediol (1-methyl-1,13-tridecanediol); 1,12-tetradecanediol (1-ethyl-1,12-dodecanediol); 1,11-tetradecanediol (1-propyl-1,11-undecanediol); 1,10-tetradecanediol (1-butyl-1,10-decanediol); 1,9-tetradecanediol (1-pentyl-1,9-nonanediol); 1,8-tetradecanediol (1-hexyl-1,8-octanediol); 1,7-tetradecanediol (1-heptyl-1,7-hexanediol); 1,6-tetradecanediol (1-octyl-1,6-hexanediol); 1,5-tetradecanediol (1-nonyl-1,5-pentanediol); 1,4-tetradecanediol (1-decyl-1,4-butanediol); 1,3-tetradecanediol (1-undecyl-1,3-propanediol); 1,2-tetradecanediol (1-dodecyl-1,2-ethanediol).

The above cited third monomers are all according to formula 2, having a linear (unbranched) $R_1$ and at least one of the $R_2$ and $R_3$ is —H.

Other examples of third monomers according to formula 2 and having —$R_2$ and —$R_3$ being optionally substituted alkyl groups comprising between 1 and 12 carbon atoms are: 1,1-dimethyl-1,2-ethanediol; 1-methyl-1-ethyl-1,2-ethanediol; 1-methyl-1-propyl-1,2-ethanediol; 1-methyl-1-butyl-1,2-ethanediol; 1-methyl-1-pentyl-1,2-ethanediol; 1-methyl-1-hexyl-1,2-ethanediol; 1-methyl-1-heptyl-1,2-ethanediol; 1-methyl-1-octyl-1,2-ethanediol; 1-methyl-1-nonyl-1,2-ethanediol; 1-methyl-1-decyl-1,2-ethanediol; 1-methyl-1-undecyl-1,2-ethanediol; 1-methyl-1-dodecyl-1,2-ethanediol; 1,1-diethyl-1,2-ethanediol; 1-ethyl-1-propyl-1,2-ethanediol; 1-ethyl-1-butyl-1,2-ethanediol; 1-ethyl-1-pentyl-1,2-ethanediol; 1-ethyl-1-hexyl-1,2-ethanediol; 1-ethyl-1-heptyl-1,2-ethanediol; 1-ethyl-1-octyl-1,2-ethanediol; 1-ethyl-1-nonyl-1,2-ethanediol; 1-ethyl-1-decyl-1,2-ethanediol; 1-ethyl-1-undecyl-1,2-ethanediol; 1-ethyl-1-dodecyl-1,2-ethanediol; 1,1-dipropyl-1,2-ethanediol; 1-propyl-1-butyl-1,2-ethanediol; 1-propyl-1-pentyl-1,2-ethanediol; 1-propyl-1-hexyl-1,2-ethanediol; 1-propyl-1-heptyl-1,2-ethanediol; 1-propyl-1-octyl-1,2-ethanediol; 1-propyl-1-nonyl-1,2-ethanediol; 1-propyl-1-decyl-1,2-ethanediol; 1-propyl-1-undecyl-1,2-ethanediol; 1-propyl-1-dodecyl-1,2-ethanediol; 1,1-dibutyl-1,2-ethanediol; 1-butyl-1-pentyl-1,2-ethanediol; 1-butyl-1-hexyl-1,2-ethanediol; 1-butyl-1-heptyl-1,2-ethanediol; 1-butyl-1-octyl-1,2-ethanediol; 1-butyl-1-nonyl-1,2-ethanediol; 1-butyl-1-decyl-1,2-ethanediol; 1-butyl-1-undecyl-1,2-ethanediol; 1-butyl-1-dodecyl-1,2-ethanediol;

1,1-dimethyl-1,3-propanediol; 1-methyl-1-ethyl-1,3-propanediol; 1-methyl-1-propyl-1,3-propanediol; 1-methyl-1-butyl-1,3-propanediol; 1-methyl-1-pentyl-1,3-propanediol; 1-methyl-1-hexyl-1,3-propanediol; 1-methyl-1-heptyl-1,3-propanediol; 1-methyl-1-octyl-1,3-propanediol; 1-methyl-1-nonyl-1,3-propanediol; 1-methyl-1-decyl-1,3-propanediol; 1-methyl-1-undecyl-1,3-propanediol; 1-methyl-1-dodecyl-1,3-propanediol; 1,1-diethyl-1,3-propanediol; 1-ethyl-1-propyl-1,3-propanediol; 1-ethyl-1-butyl-1,3-propanediol; 1-ethyl-1-pentyl-1,3-propanediol; 1-ethyl-1-hexyl-1,3-propanediol; 1-ethyl-1-heptyl-1,3-propanediol; 1-ethyl-1-octyl-1,3-propanediol; 1-ethyl-1-nonyl-1,3-propanediol; 1-ethyl-1-decyl-1,3-propanediol; 1-ethyl-1-undecyl-1,3-propanediol; 1-ethyl-1-dodecyl-1,3-propanediol; 1,1-dipropyl-1,3-propanediol; 1-propyl-1-butyl-1,3-propanediol; 1-propyl-1-pentyl-1,3-propanediol; 1-propyl-1-hexyl-1,3-propanediol; 1-propyl-1-heptyl-1,3-propanediol; 1-propyl-1-octyl-1,3-propanediol; 1-propyl-1-nonyl-1,3-propanediol; 1-propyl-1-decyl-1,3-propanediol; 1-propyl-1-undecyl-1,3-propanediol; 1-propyl-1-dodecyl-1,3-propanediol; 1,1-dibutyl-1,3-propanediol; 1-butyl-1-pentyl-1,3-propanediol; 1-butyl-1-hexyl-1,3-propanediol; 1-butyl-1-heptyl-1,3-propanediol; 1-butyl-1-octyl-1,3-propanediol; 1-butyl-1-nonyl-1,3-propanediol; 1-butyl-1-decyl-1,3-propanediol; 1-butyl-1-undecyl-1,3-propanediol; 1-butyl-1-dodecyl-1,3-propanediol.

Other examples of third monomers according to formula 2 and having a substituted —$R_1$ and —$R_2$ and —$R_3$ being independently selected from the group consisting of —H and optionally substituted alkyl groups comprising between 1 and 12 carbon atoms are: 1,2-dimethyl-1,3-propanediol; 2,2-dimethyl-1,3-propanediol, 1-methyl-2-ethyl-1,3-propanediol; 1-ethyl-2-methyl-1,3-propanediol; 1-methyl-2-propyl-1,3-propanediol; 1-propyl-2-methyl-1,3-propanediol; 1-methyl-2-butyl-1,3-propanediol; 1-butyl-2-methyl-1,3-propanediol; 1-methyl-2-pentyl-1,3-propanediol; 1-pentyl-2-methyl-1,3-propanediol; 1-methyl-2-hexyl-1,3-propanediol; 1-hexyl-2-methyl-1,3-propanediol; 1-methyl-2-heptyl-1,3-propanediol; 1-heptyl-2-methyl-1,3-propanediol; 1-methyl-2-octyl-1,3-propanediol; 1-octyl-2-methyl-1,3-propanediol; 1-methyl-2-nonyl-1,3-propanediol; 1-nonyl-2-methyl-1,3-propanediol; 1-methyl-2-decyl-1,3-propanediol; 1-decyl-2-methyl-1,3-propanediol; 1-methyl-2-undecyl-1,3-propanediol; 1-undecyl-2-methyl-1,3-propanediol; 1-methyl-2-dodecyl-1,3-propanediol; 1-dodecyl-2-methyl-1,3-propanediol; 1,2-diethyl-1,3-propanediol; 2,2-diethyl-1,3-propanediol; 1-ethyl-2-propyl-1,3-propanediol; 1-propyl-2-ethyl-1,3-propanediol; 1-ethyl-2-butyl-1,3-propanediol; 1-butyl-2-ethyl-1,3-propanediol; 1-ethyl-2-pentyl-1,3-propanediol; 1-pentyl-2-ethyl-1,3-propanediol; 1-ethyl-2-hexyl-1,3-propanediol; 1-hexyl-2-ethyl-1,3-propanediol; 1-ethyl-2-heptyl-1,3-propanediol; 1-heptyl-2-ethyl-1,3-propanediol; 1-ethyl-2-octyl-1,3-propanediol; 1-octyl-2-ethyl-1,3-propanediol; 1-ethyl-2-nonyl-1,3-propanediol; 1-nonyl-2-ethyl-1,3-propanediol; 1-ethyl-2-decyl-1,3-propanediol; 1-decyl-2-ethyl-1,3-propanediol; 1-ethyl-2-undecyl-1,3-propanediol; 1-undecyl-2-ethyl-1,3-propanediol; 1-ethyl-2-dodecyl-1,3-propanediol; 1-dodecyl-2-ethyl-1,3-propanediol 1,2-dipropyl-1,3-propanediol; 2,2-dipropyl-1,3-propanediol; 1-propyl-2-butyl-1,3-propanediol; 1-butyl-2-propyl-1,3-propanediol; 1-propyl-2-pentyl-1,3-propanediol; 1-pentyl-2-propyl-1,3-propanediol; 1-propyl-2-hexyl-1,3-propanediol; 1-hexyl-2-propyl-1,3-propanediol; 1-propyl-2-heptyl-1,3-propanediol; 1-heptyl-2-propyl-1,3-propanediol; 1-propyl-2-octyl-1,3-propanediol; 1-octyl-2-propyl-1,3-propanediol; 1-propyl-2-nonyl-1,3-propanediol; 1-nonyl-2-propyl-1,3-propanediol; 1-propyl-2-decyl-1,3-propanediol; 1-decyl-2-propyl-1,3-propanediol; 1-propyl-2-undecyl-1,3-propanediol; 1-undecyl-2-propyl-1,3-propanediol; 1-propyl-2-dodecyl-1,3-propanediol; 1-dodecyl-2-propyl-1,3-propanediol.

In an embodiment, $R_1$ is selected from the group consisting of —$CH_2$—, —$CH_2$—$CH_2$—, —$CH(CH_3)$—$CH_2$—, —$C(CH_3)_2$—$CH_2$—, —$CH(C_2H_5)$—$CH_2$—, —$C(C_2H_5)_2$—$CH_2$— and —$C(CH_3)(C_2H_5)$—$CH_2$—; $R_2$ is selected from the group consisting of —H, —$CH_3$ and —$C_2H_5$; and $R_3$ is a linear alkyl group comprising between 2 and 14 carbon atoms.

Preferably the third monomer is selected from the group consisting of 1,2-ethanediol; 1,4-butanediol; 2,2-diethyl-1,3-propanediol; 1,2-hexanediol; 1,2-decanediol, 1,2-dodecanediol; and 1,2-tetradecanediol.

In an embodiment a copolyester according to the present invention is obtainable by reacting 42 mol % of the first monomer being isosorbide, 50 mol % of the second monomer being 1,4 cyclohexanedicarboxylic acid and 8 mol % of the third monomer being selected from the group consisting of 1,2-ethanediol; 2,2-diethyl-1,3-propanediol; 1,2-hexanediol; 1,2-decanediol; 1,2-dodecanediol; and 1,2-tetradecanediol.

In an embodiment, a polyester according to the present invention has a number average molecular weight (Mn) of between 1000 and 10000 g/mol, preferably between 1500 and 5000 g/mol, more preferably between 2000 and 3500 g/mol and a weight average molecular weight (Mw) of between 1500 and 30000 g/mol, preferably between 3000 and 15000 g/mol, more preferably between 4500 and 10000 g/mol.

Process for Preparing a (Partly) Bio-Based Copolyester According to the Present Invention The present invention also relates to a process for preparing a (partly) bio-based copolyester according to the present invention, the process comprising the steps of:
a. bringing between 30 and 50 mol % of a first monomer being an isohexide; between 40 and 60 mol % of a second monomer being an aromatic dicarboxylic acid or a cycloaliphatic dicarboxylic acid; and between 1 and 20 mol % of a third monomer being a branched aliphatic diol in a reactor under an inert atmosphere;
b. heating the mixture to a temperature of between 150° C. and 200° C. until the mixture obtained in step a has melted;
c. adding a condensation catalyst in an amount of up to 1 mol %, preferably between 0.001 and 0.5 mol %, more preferably between 0.003 and 0.1 mol % and most preferably between 0.005 and 0.05 mol % with respect to the mixture obtained in step a;
d. stirring the reaction mixture for at least 1 hour at a temperature of between 200° C. and 300° C., preferably between 210° C. and 275° C., more preferably between 220° C. and 250° C.;
e. removing the obtained reaction water;
f. stirring the reaction mixture for at least another hour at a temperature of between 200° C. and 300° C. preferably between 210° C. and 275° C., more preferably between 220° C. and 250° C., and under vacuum;
g. cooling the reaction product under an inert atmosphere to room temperature.

The polymerization reaction of the three monomers may be carried out in the melt and is a polycondensation reaction, wherein the monomers react to form ester linkages and discharge water (also referred to as reaction water).

Generally all salts of Li, Ca, Mg, Mn, Zn, Pb, Sn, Sb, Ge and Ti, such as acetate salts and oxides, including glycol adducts and Ti alkoxides, are suitable condensation catalysts.

Particular examples of suitable condensation catalysts are: titanium(IV)(tert)-butoxide; tin(II)oxide; zinc acetate; antimony(III)oxide and tin(II) 2-ethylhexanoate.

In order to take the reaction to completeness or at least to a high conversion, the water must be removed from the reacting mixture such that reaction equilibrium is never reached, and the reaction may come to completion. In order to be able to easily remove the water formed during the polycondensation reaction, the reactor may be equipped with a Dean-Stark trap. A Dean-Stark trap or apparatus (or Dean-Stark receiver or distilling trap) is a piece equipment used in synthetic chemistry to collect water (or occasionally other liquid) from a reactor. It may be used in combination with a reflux condenser and a batch reactor for continuous removal of the water (from a two-phase reacting system) that is produced during a chemical reaction performed at reflux temperature.

In the context of the present invention a vacuum is to be construed as a pressure of below $10^{-2}$ mbar and an inert atmosphere is to be construed as an atmosphere containing inert components, i.e. components that do not react with or influence the reaction between the three monomers, e.g. a nitrogen atmosphere.

In a preferred embodiment the process for preparing a (partly) bio-based copolyester according to the present invention comprises the steps of
a. bringing between 35 and 47 mol % of a first monomer being an isohexide; between 45 and 55 mol % of a second monomer being an aromatic dicarboxylic acid or a cycloaliphatic dicarboxylic acid; and between 3 and 15 mol % of a third monomer being a branched aliphatic diol under an inert atmosphere in a reactor equipped with a Dean-Stark trap;
b. heating the mixture to a temperature of between 160° C. and 190° C. until the mixture obtained in step a melts;
c. adding up to 1 ml, preferably between 0.05 and 0.5 ml tin(II) 2-ethylhexanoate as a condensation catalyst;
d. stirring the reaction mixture for at least 1 hour at a temperature of between 210° C. and 250° C.;
e. removing the obtained water from the Dean-Stark trap;
f. stirring the reaction mixture for at least another hour at a temperature of between 210° C. and 250° C. and under vacuum;
g. cooling the reaction product under an inert atmosphere to room temperature.

As an embodiment, a copolyester obtainable by a process as described above, the copolyester having an acid number of between 10 and 50, is disclosed.

Latex Composition

In the context of the present invention, a latex and a latex composition are defined as a stable dispersion of polymer nano- or microparticles in a liquid medium, the medium preferably being water.

The present invention also relates to a latex composition comprising water as a medium; and between 10 and 50 wt %, preferably between 15 and 45, more preferably between 17 and 40 wt % and even more preferably between 18 and 30 wt % particles of a copolyester according to any one of the previously described embodiments dispersed in the medium, the particles having an average diameter of between 10 and 1000 nm, preferably between 15 and 500 nm, more preferably between 20 and 200 nm. The copolyester according to the present invention has an acid number of between 10 and 50, preferably between 12 and 45, more preferably between 15 and 35.

In an embodiment, the particles of the polyester are substantially spherical.

In an embodiment, the latex composition according to the present invention further comprises a cosolvent and/or a surface tension modifying agent.

In an embodiment, the latex composition further comprises a colorant.

Cosolvents

Most small (i.e. having a low molecular weight) water-soluble organic di- or triols are suitable to be used as cosolvents.

Examples of suitable cosolvents are: Ethyleneglycol, diethylene glycol butyl ether, dipropyleneglycol-monomethylether, glycerol, 1,2-propanediol, 2-pyrrolidone and tetraethyleneglycol.

Colsolvents may be used to 1) adjust the viscosity of the latex composition; 2) adjust film formation of the ink on a receiving material; and 3) prevent clogging of the nozzles.

Colorants

The colorant may be a pigment, a mixture of pigments, a dye, a mixture of dyes, a mixture of a dye and a pigment or a mixture of more than one dye and more than one pigment. Pigments are preferred, because of their superior color fastness with respect to dyes.

Examples of suitable colorants (in the context of the present invention) are, but not limited to: Carbon black, Pigment Yellow 74, Pigment red 122, Pigment Blue 15:3. Preferably the colorants are added to the latex composition as a stable dispersion in water Surface Tension Modifying Agent The surface tension modifying agent, may be any compound that has surface active properties and does not react with other components of the latex composition. Examples of suitable surface tension modifying agents are surfactants like the Triton X series (Triton X-100), which are octylphenolethoxylate surfactants; aerosol OT (dioctyl sodium sulphosuccinate), SDS (sodium dodecyl sulphate) and polysiloxane based surfactants (e.g. Byk 349).

If the above described latex composition is to be used as a latex ink, in particular for use in ink-jet printing, the polyester particles have to be small enough in order not to block the nozzles of the selected print head. The stability of the latex should also be high enough that upon e.g. evaporation of water the ink does not destabilize to such an extent that aggregates of polyester particles are formed, which may block the nozzles of the print head (i.e. clogging). For the above reasons, the latex composition comprises polyester particles having a diameter of between 20 and 200 nm. The polyester has an acid number of between 12 and 45.

Surface tension modification may be used to optimize properties such as drop-formation when the ink is jetted with a certain type of print head (i.e. different surface tension requirements may be imposed by different types of print heads). Also spreading of the ink on the receiving material, e.g. plain paper, may be controlled by adjusting the surface tension of the latex composition.

Process for Preparing a Latex Composition According to the Present Invention

The invention further relates to a process for preparing a latex composition according to the present invention, comprising the steps of:
i. dissolving a copolyester resin according to the present invention having an acid number of between 10 and 50 in a water-soluble solvent, e.g. THF, acetone, methanol, ethanol, isopropylalcohol (IPA) or ethylacetate, whereby the weight ratio of resin to solvent ranges between 0.1 and 2.5, preferably between 0.5 and 1.5, more preferably between 0.8 and 1.2;
ii. adding a deprotonating agent, being a water-soluble base, to the mixture in an amount such that the molar amount of deprotonating groups ranges between 0.5 and 1.5, preferably between 0.6 and 1.3, more preferably between 0.7 and 1.2 times the molar amount KOH necessary to determine the acid number of the polyester resin;
iii. heating the mixture obtained in step ii to a temperature of between 35° C. and 90° C., preferably between 40° C. and 85° C., more preferably between 45° C. and 80° C.;
iv. separately heating an amount of water to a temperature substantially equal to the temperature of step iii, the amount of water being in the range of between 2 and 6, preferably between 2.5 and 5, more preferably between 3 and 4 times the weight of the polyester resin;
v. adding the water obtained in step iv to the mixture obtained in step iii under vigorous stirring at a speed of between 1600 and 2200 rpm, preferably between 1700 and 2100 rpm, more preferably between 1800 and 2000 rpm;
vi. removing the water-soluble solvent by distillation.

In an embodiment, the process for preparing a latex according to the present invention, the deprotonating agent used in step ii comprises a water-soluble organic bases, like organic amines preferably a compound selected from the group consisting of triethylamine, triethanolamine, ammonium hydroxide or water-soluble inorganic bases like sodium hydroxide, potassium hydroxide, sodium carbonate and the like. Preferably triethylamine is used as a deprotonating agent The mass amount of deprotonating agent depends on the acid number of the polyester and on the functionality of the deprotonating agent. For example, if the polyester has an acid number of 20, which means that 1 gram of the polyester resin is neutralized with 20 mg of KOH which is equal to 0.36 mmol KOH (the molar mass of KOH is 56.1 g/mol).

An equimolar amount of a monofunctional deprotonating agent, such as triethylamine which is equal to 36.1 mg triethylamine is suitable to neutralize 1 gram of polyester resin (molar mass of triethylamine is 101.2 g/mol). When a difunctional deprotonating agent is used, half the molar amount suffices to provide an equimolar amount of functional deprotonating groups.

With the amount of deprotonating agent, also the particle size can be controlled. The larger the used amount of deprotonating agent is, the more acid groups of the polyester resin are deprotonated and the larger the fraction of the polyester bearing a (negative) charge is. The charged polyester molecules have a stabilizing effect when the polyester is dispersed in water, i.e. the deprotonated polyester acts in a similar way as a surfactant. The stabilizing effect is only required at the water-resin interface. Small particles have a larger surface to volume ratio than large particles and thus require more (surface) stabilization. Therefore increasing the amount of deprotonating agent results in smaller particles when the polyester is dispersed in water.

In an embodiment, the process for preparing a latex according to the present invention further comprises the steps of:
vii. adding a colorant, preferably in the form of a dispersion comprising between 10 and 30 wt %, preferably between 15 and 25 wt %, more preferably between 18 and 22 wt % of at least one pigment to the latex obtained in step vi;
viii. adding between 0.1 and 5 wt % preferably between 0.15 and 2 wt %, more preferably between 0.2 and 1 wt % with respect to the total latex composition of a surface tension modifying agent, in particular a surfactant like the Triton X series (Triton X-100), which are octylphenolethoxylate surfactants; aerosol OT (dioctyl sodium sulphosuccinate), SDS (sodium dodecyl sulphate) and polysiloxane based surfactants (e.g. Byk 349).
ix. optionally adding water;
x. adding between 0 and 40 wt %, preferably between 15 and 35 wt %, more preferably between 20 and 30 wt % with respect to the total latex composition of a cosolvent, the cosolvent being a small water-soluble organic di- or triol preferably selected from the group consisting of: ethyleneglycol, diethylene glycol butyl ether, dipropyleneglycol-monomethylether, glycerol, 1,2-propanediol, 2-pyrrolidone and tetraethyleneglycol;

xi. stirring the mixture obtained in step x for between 5 and 20 minutes, preferably between 6 and 15 minutes, more preferably between 7 and 12 minutes;

wherein the obtained latex composition comprises between 1 and 10 wt %, preferably between 3 and 8 wt %, more preferably between 4 and 6 wt % of the colorant and wherein the weight ratio of resin to colorant is between 0.5 and 3.0, preferably between 0.75 and 2.5, more preferably between 1.0 and 2.3.

In this respect the mass of the total latex composition is equal to the sum of the masses of all components added in steps i, ii, v, vii, viii, ix, and x minus the mass of the removed solvent in step vi. Because substantially all water-soluble solvent is removed in step vi, the mass of the total latex composition is substantially equal to the sum of the masses of the copolyester resin (step i); the deprotonating agent (step ii); water (steps v and optionally step ix); colorant dispersion (including water, step vii); surface tension modifying agent (step viii) and the cosolvent (step x).

The purpose of step viii is to optimize the surface tension of the latex composition such that the latex composition obtains improved properties like: improved drop-formation, improved wetting and improved drop spreading characteristics on a receiving material, e.g. paper. If desired more surface tension modifying agent may be added.

With steps ix and x, the total solids content and the viscosity of the latex can be tuned. The cosolvent is also added to prevent nozzle-clogging. Due to the relatively low vapor tension of the cosolvent (compared to water), the cosolvent does not have the tendency to evaporate easily during non operation of a nozzle. The risk of agglomeration of solids in the latex composition that can cause nozzle clogging is therefore significantly reduced. It is essential that the cosolvent is added last.

The latex composition according to the present invention or the latex composition as obtained by a process according to the present invention may be used in an ink composition, in particular for use in an ink-jet process, i.e. an ink-jet ink composition. The present invention therefore also relates to a latex ink comprising a latex composition according to any embodiment of the present invention or as obtained with a process according to any embodiment of the present invention. A latex ink preferably comprises a latex composition comprising a colorant.

Ink-Jet Printing Process

FIG. 1 shows an ink jet printing assembly 3. The ink jet printing assembly 3 comprises supporting means for supporting an image receiving member 2. The supporting means are shown in FIG. 1 as a platen 1, but alternatively, the supporting means may be a flat surface. The platen 1, as depicted in FIG. 1, is a rotatable drum, which is rotatable about its axis as indicated by arrow A. The supporting means may be optionally provided with suction holes for holding the image receiving member in a fixed position with respect to the supporting means. The ink jet printing assembly 3 comprises print heads 4a-4d, mounted on a scanning print carriage 5. The scanning print carriage 5 is guided by suitable guiding means 6, 7 to move in reciprocation in the main scanning direction B. Each print head 4a-4d comprises an orifice surface 9, which orifice surface 9 is provided with at least one orifice 8. The print heads 4a-4d are configured to eject droplets of marking material onto the image receiving member 2. The platen 1, the carriage 5 and the print heads 4a-4d are controlled by suitable controlling means 10a, 10b and 10c, respectively. The marking material may be an ink according to the present invention.

The image receiving member 2 may be a medium in web or in sheet form and may be composed of e.g. paper, cardboard, label stock, coated paper, plastic or textile. Alternatively, the image receiving member 2 may also be an intermediate member, endless or not. Examples of endless members, which may be moved cyclically, are a belt or a drum. The image receiving member 2 is moved in the sub-scanning direction A by the platen 1 along four print heads 4a-4d provided with a fluid marking material.

A scanning print carriage 5 carries the four print heads 4a-4d and may be moved in reciprocation in the main scanning direction B parallel to the platen 1, such as to enable scanning of the image receiving member 2 in the main scanning direction B. Only four print heads 4a-4d are depicted for demonstrating the invention. In practice an arbitrary number of print heads may be employed. Also one or more single page wide print head may be used, such that an image may be printed in a single pass of the receiving material. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving member 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6, 7. These guiding means 6, 7 may be rods as depicted in FIG. 1. The rods may be driven by suitable driving means (not shown). Alternatively, the carriage 5 may be guided by other guiding means, such as an arm being able to move the carriage 5. Another alternative is to move the image receiving material 2 in the main scanning direction B.

Each print head 4a-4d comprises an orifice surface 9 having at least one orifice 8, in fluid communication with a pressure chamber containing fluid marking material provided in the print head 4a-4d. On the orifice surface 9, a number of orifices 8 is arranged in a single linear array parallel to the sub-scanning direction A. Eight orifices 8 per print head 4a-4d are depicted in FIG. 1, however obviously in a practical embodiment several hundreds of orifices 8 may be provided per print head 4a-4d, optionally arranged in multiple arrays. As depicted in FIG. 1, the respective print heads 4a-4d are placed parallel to each other such that corresponding orifices 8 of the respective print heads 4a-4d are positioned in-line in the main scanning direction B. This means that a line of image dots in the main scanning direction B may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 8.

Upon ejection of the marking material, some marking material may be spilled and stay on the orifice surface 9 of the print head 4a-4d. The ink present on the orifice surface 9, may negatively influence the ejection of droplets and the placement of these droplets on the image receiving member 2. Therefore, it may be advantageous to remove excess of ink from the orifice surface 9. The excess of ink may be removed for example by wiping with a wiper and/or by application of a suitable anti-wetting property of the surface, e.g. provided by a coating.

EXAMPLES

Materials

Isosorbide was obtained from Sigma-Aldrich.
1,4-butanediol was obtained from Fluka.
1,2-ethanediol, 2,2-diethyl-1,3-propanediol, 1,2-hexanediol, 1,2-decanediol, 1,2-dodecane diol, 1,2-tetradecanediol, cyclohexanedicarboxylic acid, tin(II) 2-ethylhexanoate Triton X-100 and tetraethyleneglycol were obtained from Sigma-Aldrich. Tetrahydrofuran (THF) and triethylamine were obtained from Merck 20% black pigment dispersion (Cabo-jet Black) was obtained from Cabot Corporation. All compound are used as obtained.

Measurement Methods
Waterfastness

Of a sample taken from a medium printed with an ink, the color is determined by measuring the (initial) Lab-values using a Xrite 964 spectrophotometer. Lab-values represent coordinates in a color space. The method as described in standard ISO 11798 is used as a guidance and used in a slightly modified way. The method comprises the steps of:
the test ink (latex ink) is printed on a receiving material (e.g. red label, TCP, MC150, MC 500);
the Lab-values are determined as described above;
the sample is then immersed in dematerialized water for 24 hours;
the immersed sample is dried and wiped with a paper cloth;
afterwards, the Lab-values of the immersed sample are again measured according to the above method and the difference with the initial Lab-values is calculated and expressed as ΔE. The maximum acceptable change in color is expressed by the maximum change in Lab-values: $\Delta L^* = \pm 5$, $\Delta a^* = \pm 3$ and $\Delta b^* = \pm 3$ (i.e. $\Delta E^* = \sqrt{(\Delta L^{*2} + \Delta a^{*2} + \Delta b^{*2})} = \sqrt{((\pm 5)^2 + (\pm 3)^2)} = 6.6$)

Scratchfastness

Scratchfastness was measured using the following method:
A scratch is made using a normal force of 28 cN.
The relative difference in optical density, OD, (measured with a Gretag Macbeth D19C OD meter) between the surface of the scratch and the area right next to the scratch is measured;
The OD difference between the surface of the scratch and the area right next to the scratch is a measure of scratchfastness.
An OD difference of below 5% represents an acceptable scratchfastness.

Blocking Resistance

The blocking resistance is determined according to ISO 11798 and comprises the following steps:
sample preparation: 1) cutting printed sample of a receiving material of 7×7 cm; 2) cutting unprinted sample of a receiving material of the same size; 3) alternatingly stacking printed parts and unprinted parts, such that unprinted receiving material is in direct contact with a printed part;
placing a weight onto the stack comparable to a force of 7 kPa, at 30° C. and 60% relative humidity for 6 days;
For a positive judgment of the test result, the printed and unprinted samples may not stick to each other and no image transfer from a printed sample to an unprinted sample may have occurred.

Glass Transition Temperature ($T_g$)

The $T_g$ is determined according to ASTM E 1356-03 with differential scanning calorimetry and measured with a TA instruments Q2000. The prepared sample was heated at a rate of 10° C./min. The onset of the $T_g$ was determined during a second run (i.e. sample was heated and cooled first before starting the measurement). The $T_g$ is a secondary transition and can be determined by analyzing the deflection point of the DSC curve.

Acid Value

The acid value was measured by potentiometric titration (combined electrode) with 0.1 n KOH (Sigma-Aldrich) in methanol using a Metrohm titrino 716. The resin samples were dissolved in a 50:50 (V/V) acetone:toluene mixture prior to titration.

Molecular Weight

For determination of the molecular weight of the bio resist, Size Exclusion Chromatography (SEC) is used. First the sample has to be dissolved in tetrahydrofuran (THF; Rathburn, unstabilized). When the resist in THF is cloudy it has to be centrifuged.

The solution is measured with the following conditions:
eluent THF (unstabilized)+1% acetic acid
flow 0.7 ml/min
column: 1× PL-gel pre column-2× PL-gel Mixed C ($d_p$=5 μm, 7.5×300 mm at 40° C.
injection volume 50 μL
The Refractive index signal of the detector (Viscotek TriSec model 302) is used. With a polystyrene conventional calibration the molecular weight is determined.

Particle Size

Particle size distribution of the latex is measured with a Zetasizer Nano S/HT. The used measuring principle is Dynamic Light Scattering (DLS also known as Photon Correlation Spectroscopy or Quasi-Elastic Light Scattering). The position of the detector of the Zetasizer is at 173° (with respect to the laser). The diluted (approximately 1000 times) latex is measured at 25° C. with a standard measuring program. The Zetasizer determines the optimal measuring parameters (measurement position, attenuation of the laser and number of measuring runs) dependant on the quality of the dispersion/suspension. The particle size distribution is a Z-average in nm.

Viscosity

Viscosity was measured with a HAAKE Rheostress RS 600 rheometer equipped with a HAAKE Universal Temperature Controller using plate-plate geometry sensor system (PP60) at 25° C. (CR Method).

Surface Tension

Dynamic surface tension was measured according to the method described by Hua et al. (Dynamic Surface Tension of Aqueous Surfactant Solutions, Journal of Colloid and Interface Science, Vol 124, No. 2, August 1988) with a SITA science line t60 tensiometer outfitted with a Sita PEEK capillary. Surface tension at a frequency of 0.2 Hz is noted as the relevant parameter.

Example 1

Preparation of Copolyester 0.21 mol isosorbide (30.7 g), 0.04 mol 1,4-butanediol (3.6 g) and 0.25 mol 1,4-cyclohexanedicarboxylicacid (43.0 g) was brought under nitrogen atmosphere into a three-neck round-bottom flask equipped with a Dean-Stark trap. The mixture was then heated and at 180° C. 0.1 ml. tin(II) 2-ethylhexanoate was added to the molten reaction mixture. The reaction mixture was stirred at 230° C. for 3.5 hours. The water formed during the (poly)condensation reaction was removed from the Dean-Stark trap. The reaction mixture was stirred at 230° C. for another 3.5 hours under vacuum (i.e. at a pressure of at most $10^{-2}$ mbar). The slightly yellow, transparent product was cooled under nitrogen to room temperature. The prepared polyester has a glass temperature (Tg) of 66° C., an acid-value of 23.6 mgr KOH/g and a molecular weight of 2600 (Mn) and 6400 (Mw) (see entry 1 in Table 1).

Preparation of a Latex 50 g of the above obtained resin was brought into a beaker together with 45-50 g tetrahydrofuran and stirred. After the resin has been dissolved 3.5 ml of triethylamine was used to fully deprotonate the resin (stoichiometric amount would be 2.9 ml). The temperature of the mixture was then increased to around 50° C. An amount of around 180 g of demineralized water was also heated to 50° C. and added to the resin mixture under vigorous stirring, which in this case was achieved by using a dissolver disc at approximately 1800 rpm. Finally the solvent (tetrahydrofuran) was removed by distillation. The formed latex has the following properties: Z-average particle size: 28 nm., viscosity: 5.25 mPas and surface tension:36.2 mN/m.

Preparation of an Ink 6.23 g of a 20% black pigment dispersion (Cabo-jet Black in this case) was added to 12.5 g of the above obtained latex, under gently stirring with a magnetic stirrer at approximately 100-200 rpm. To adapt the surface tension of the mixture, 0.3 g Triton X-100 and 0.9 g water (to adapt the viscosity) were added. Finally, 5 g tetraethyleneglycol was added as a co-solvent. The mixture was stirred for 10 minutes and filtered using a 450 nm filter before use.

Comparative Example A

Example 1 was repeated, wherein the dicarboxylic acid, being 1,4-cyclohexanedicarboxylic acid, was replaced by the same molar amount of succinic acid. The result are shown in Table 1, entry A.

Comparative Example B

Comparative example A was repeated, wherein the second diol, 1,4-butanediol, was replaced by the same molar amount of 1,2 decane diol.

Examples 2-7

Example 1 was repeated, wherein the second diol, being 1,4-butanediol was replaced by the same molar amount of the another diol as indicated in Table 1 (entries 2-7).

Printing of an Ink

Test prints were made on different substrates, using a Fujifilm Dimatix DMP cartridge (PN 700-10702-01) inkjet print head:

Inks prepared according to examples 2-7 and comparative example A were printed on Océ polyester MC150 and MC500, for performing waterfastness tests (see Table 1)

Inks prepared according to examples 1, 6 and comparative example B were printed on Océ Red label (plain paper) and standard machine coated media (TCP), for performing waterfastness tests, scratchfastness tests and blocking resistance tests (see Table 2).

TABLE 1

Results of experiments (Examples 1-7 and comparative example A)

| Entry | diacid | 2$^{nd}$ diol | Acid value (mg KOH/g resin) | T$_g$ (° C.) | ΔE (MC150) | ΔE (MC500) |
|---|---|---|---|---|---|---|
| A | succinic acid | 1,4-butanediol | 8.3 | 47 | 10.6 | 3.25 |
| 1 | 1,4-CHDA[1] | 1,4-butanediol | 15.2 | 56 | 7 | 1.93 |
| 2 | 1,4-CHDA[1] | 1,2-ethanediol | 21 | 91 | 2 | 0.37 |
| 3 | 1,4-CHDA[1] | 2,2-diethyl-1,3-propanediol | 18.4 | 80 | 0.81 | 0.63 |
| 4 | 1,4-CHDA[1] | 1,2-hexanediol | 44 | 67 | 1.03 | 0.92 |
| 5 | 1,4-CHDA[1] | 1,2-decanediol | 23.6 | 60 | 0.31 | 0.48 |
| 6 | 1,4-CHDA[1] | 1,2-dodecanediol | 44 | n/a[2] | 0.43 | 1.71 |
| 7 | 1,4-CHDA[1] | 1,2-tetradecanediol | 26.8 | 57 | 0.78 | n/a[2] |

[1]1,4-cyclohexanedicarboxylic acid
[2]not available

The results of the experiments show that the replacement of succinic acid (i.e. the linear dicarboxylic acid used in comparative example A) by 1,4-cyclohexane dicarboxylic acid (1,4-CHDA) results in an improved, however insufficiently improved, waterfastness (compare entry 1 with entry A of Table 1; Note: the lower ΔE, the better the waterfastness is). 1,4-cyclohexane dicarboxylic acid has also been chosen to tune the polymer chain stiffness in order to increase the $T_g$.

Table 1 further shows that decreasing the chain length between the —OH groups of the diol leads to a further improvement of the waterfastness (compare Example 2 with Example 1). However, by doing so, the $T_g$ increases to undesired values (the most desired value of the $T_g$ lies between 50° C. and 65° C.).

Table 1 also shows that using a secondary diol as a second diol, instead of a primary diol, the $T_g$ can be fine tuned a somewhat lower temperature. Also some more apolar character is introduced in the polymer by doing so, which increases the waterfastness of the final prints (lower ΔE).

TABLE 2

Results of experiments (Examples 1, 6 and comparative example B)

| Entry | diacid | $2^{nd}$ diol | Acid Value (mg KOH/g) resin | Tg (° C.) | Water fastness ΔE (Red Label) | Water fastness ΔE (TCP) | Scratch fastness (%) (Red Label) | Scratch fastness (%) (TCP) |
|---|---|---|---|---|---|---|---|---|
| B | Succinic acid | 1,2-decanediol | 12.43 | 47 | 3.76 | 6.95[1] | n/a | 3.7 |
| 1 | 1,4-CHDA | 1,4-butanediol | 15.11 | 51 | 2.30 | 1.20 | 1.4 | 8.5 |
| 5 | 1,4-CHDA | 1,2-decanediol | 23.6 | 60 | 0.99 | 2.04 | 0.0 | 0.0 |

| Entry | diacid | $2^{nd}$ diol | Acid Value (mg KOH/g) resin | Tg (° C.) | Blocking (Red Label) Sticks yes or no/transfer) | Blocking (TCP) Sticks yes or no/transfer) |
|---|---|---|---|---|---|---|
| B | Succinic acid | 1,2-decanediol | 12.43 | 47 | No/nihil | Yes/much |
| 1 | 1,4-CHDA | 1,4-butanediol | 15.11 | 51 | Yes/little | No/little |
| 5 | 1,4-CHDA | 1,2-decanediol | 23.6 | 60 | No/nihil | No/mediocre |

Table 2 shows that the ink of example 6 shows the best performance: the waterfastness and scratch fastness have significantly improved when compared to the results of comparative example B, while retaining the good blocking resistance. The improvement can be attributed to the substitution of succinic acid by 1,4-CHDA.

For TCP, the ink of example 6 shows an improved waterfastness, scratchfastness and blocking resistance when compared to comparative example B. The blocking resistance and the waterfastness further improve when 1,4 butanediol is used as a second diol instead of 1,2 decanediol (compare entry 1 to 6). However, in doing so the scratch fastness deteriorates. Without wanting to be bound to any theory it is thought that this may be due to the fact that the coating of the media (TCP) influences film formation and adherence of the ink to the coated surface. Apparently, using a second diol having a shorter bridge (i.e. $R_1$ in Formula 2) and a longer side chain (i.e. $R_2$ or $R_3$ in Formula 2) improves the adherence to the coated surface of the TCP media.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language).

The invention claimed is:

1. A latex composition, comprising:
   water as a medium and
   between 10 and 50 wt % particles of a copolyester dispersed in the medium, the particles having an average diameter of between 10 and 1000 nm;
   wherein the copolyester is a reaction product of a mixture comprising:
      from between 30 and 50 mol % of a first monomer being an isohexide;
      between 40 and 60 mol % of a second monomer being an aromatic dicarboxylic acid or a cycloaliphatic dicarboxylic acid; and
      between 1 and 20 mol % of a third monomer being an aliphatic diol,
      the copolyester having an acid number of between 10 and 50.

2. The latex composition according to claim 1, further comprising a cosolvent and/or a surface tension modifying agent.

3. The latex composition according to claim 1, further comprising a colorant.

4. A process for preparing a latex composition according to claim 1, comprising the steps of:
   i. dissolving a copolyester, comprising: from between 30 and 50 mol % of a first monomer being an isohexide; between 40 and 60 mol % of a second monomer being an aromatic dicarboxylic acid or a cycloaliphatic dicarboxylic acid; and between 1 and 20 mol % of a third monomer being an aliphatic diol, the copolyester having an acid number of between 10 and 50 in a water-soluble solvent, whereby the weight ratio of copolyester to solvent ranges between 0.1 and 2.5;

ii. adding a deprotonating agent to the mixture in an amount such that the molar amount of deprotonating groups ranges between 0.5 and 1.5 times the molar amount KOH necessary to determine the acid number of the copolyester;

iii. heating the mixture obtained in step ii to a temperature of between 35° C. and 90° C.;

iv. separately heating an amount of water to a temperature substantially equal to the temperature of step iii, the amount of water being in the range of between 2 and 6 times the weight of the copolyester;

v. adding the water obtained in step iv to the mixture obtained in step iii under vigorous stirring at a speed of between 1600 and 2200 rpm;

vi. removing the solvent by distillation to form the latex composition.

5. The process according to claim 4, further comprising the steps of:

vii. adding a colorant, to the latex obtained in step vi;

viii. adding between 0.1 and 5 wt % with respect to the total latex composition of a surface tension modifying agent;

ix. optionally adding water;

x. adding between 0 and 40 wt % with respect to the total latex composition of a cosolvent, the cosolvent being a small water-soluble organic di- or triol;

xi. stirring the mixture obtained in step x for between 5 and 20 minutes.

wherein the obtained latex composition comprises between 1 and 10 wt % of the colorant and wherein the weight ratio of resin to colorant is between 0.5 and 3.0.

6. An ink composition, comprising:
a latex composition according to claim 1.

7. An ink composition, comprising:
a latex composition obtained according to a process according to claim 4.

8. The process according to claim 5, wherein
the colorant added in step vii is a dispersion comprising between 10 and 30 wt % of at least one pigment;
the surface tension modifying agent added in step viii is selected from the group consisting of polyethylene glycol p-(1,1,3,3,-tetramethylbutyl)-phenyl ether, dioctyl sodium sulphosuccinate, sodium dodecyl sulphate and polysiloxane based surfactants; and
the cosolvent added in step x is selected from the group consisting of: ethyleneglycol, diethylene glycol butyl ether, dipropyleneglycol-monomethylether, glycerol, 1,2-propanediol, 2-pyrrolidone and tetraethyleneglycol.

9. The process according to claim 4, wherein in step ii the deprotonating agent is a water-soluble base.

10. The process according to claim 9, further comprising the steps of:
adding a colorant, to the latex obtained in step vi;
adding between 0.1 and 5 wt % with respect to the total latex composition of a surface tension modifying agent;
optionally adding water;
adding between 0 and 40 wt % with respect to the total latex composition of a cosolvent, the cosolvent being a small water-soluble organic di- or triol;
stirring the mixture obtained in step x for between 5 and 20 minutes.
wherein the obtained latex composition comprises between 1 and 10 wt % of the colorant and wherein the weight ratio of resin to colorant is between 0.5 and 3.0.

11. The process according to claim 9, wherein in step ii the deprotonating agent is selected from the group consisting of triethylamine, triethanolamine, ammonium hydroxide, sodium hydroxide, potassium hydroxide and sodium carbonate.

12. The process according to claim 11, further comprising the steps of:
adding a colorant, to the latex obtained in step vi;
adding between 0.1 and 5 wt % with respect to the total latex composition of a surface tension modifying agent;
optionally adding water;
adding between 0 and 40 wt % with respect to the total latex composition of a cosolvent, the cosolvent being a small water-soluble organic di- or triol;
stirring the mixture obtained in step x for between 5 and 20 minutes.
wherein the obtained latex composition comprises between 1 and 10 wt % of the colorant and wherein the weight ratio of resin to colorant is between 0.5 and 3.0.

13. An ink composition, comprising a latex composition obtained according to a process according to claim 9.

14. An ink composition, comprising a latex composition obtained according to a process according to claim 11.

* * * * *